US012623594B2

(12) United States Patent　　　(10) Patent No.:　　US 12,623,594 B2
Martin et al.　　　　　　　　　　(45) Date of Patent:　　　May 12, 2026

(54) SHAPED PART AND METHOD FOR PRODUCING A SHAPED PART

(71) Applicant: Novem Car Interior Design GmbH, Vorbach (DE)

(72) Inventors: Alexander Martin, Neuhaus (DE); Daniel Hopf, Bayreuth (DE)

(73) Assignee: Novem Car Interior Design GmbH, Vorbach (DE)

( * ) Notice: Subject to any disclaimer, the term of this patent is extended or adjusted under 35 U.S.C. 154(b) by 0 days.

(21) Appl. No.: 18/885,582

(22) Filed: Sep. 14, 2024

(65) Prior Publication Data

US 2025/0091508 A1　　Mar. 20, 2025

(30) Foreign Application Priority Data

Sep. 14, 2023　(DE) .......................... 102023124877.4

(51) Int. Cl.
*B60Q 3/64*　　　　(2017.01)
*B60Q 3/54*　　　　(2017.01)
　　　　　　(Continued)

(52) U.S. Cl.
CPC ................. *B60Q 3/64* (2017.02); *B60Q 3/54* (2017.02); *B60Q 3/72* (2017.02); *B60Q 3/78* (2017.02); *B60R 13/02* (2013.01)

(58) Field of Classification Search
CPC ... B60Q 3/64; B60Q 3/72; B60Q 3/78; B60Q 3/54; B60R 13/02
　　　　　　(Continued)

(56) References Cited

U.S. PATENT DOCUMENTS

2005/0018439 A1* 1/2005 Schevardo ........... G02B 6/4298
　　　　　　　　　　　　　　　　362/471
2011/0127906 A1* 6/2011 Mitsuya ............. H10K 85/6572
　　　　　　　　　　　　　　　　313/504

(Continued)

FOREIGN PATENT DOCUMENTS

DE　　202018101500 U1　　3/2019
DE　　102019211228 A1　　2/2021
DE　　102021107693 A1 *　9/2022 ............... B60Q 3/54

OTHER PUBLICATIONS

Communication of the German Office regardong the Third Party Submission from corresponding DE Application No. 102023124877. 4, mailed Apr. 16, 2025, all pages cited in its entirety.

*Primary Examiner* — Laura K Tso

(74) *Attorney, Agent, or Firm* — Burr & Forman

(57)　　　　　ABSTRACT

The invention relates to a shaped part comprising a decorative layer with a front side and a rear side, a light-guiding element comprising a main body and one or more light guides protruding from a front side of the main body, wherein the main body is arranged with its front side on the rear side of the decorative layer and the light guide(s) completely penetrate/s the decorative layer, and one or more light elements arranged in and/or on the light-guiding element, wherein light emanating from the light elements is guided via the light guide(s) to the front side of the decorative layer. A light-shielding layer is arranged between the surface of the light guide(s) and the decorative layer, in particular a light-shielding element, wherein the light-shielding layer has an interruption, through which light can escape, on the front side of the decorative layer on each light guide. The invention also relates to methods for producing a shaped part that comprise, as a method step, pressing the light-shielding element and/or the light guides of the light- (Continued)

Figure 1:
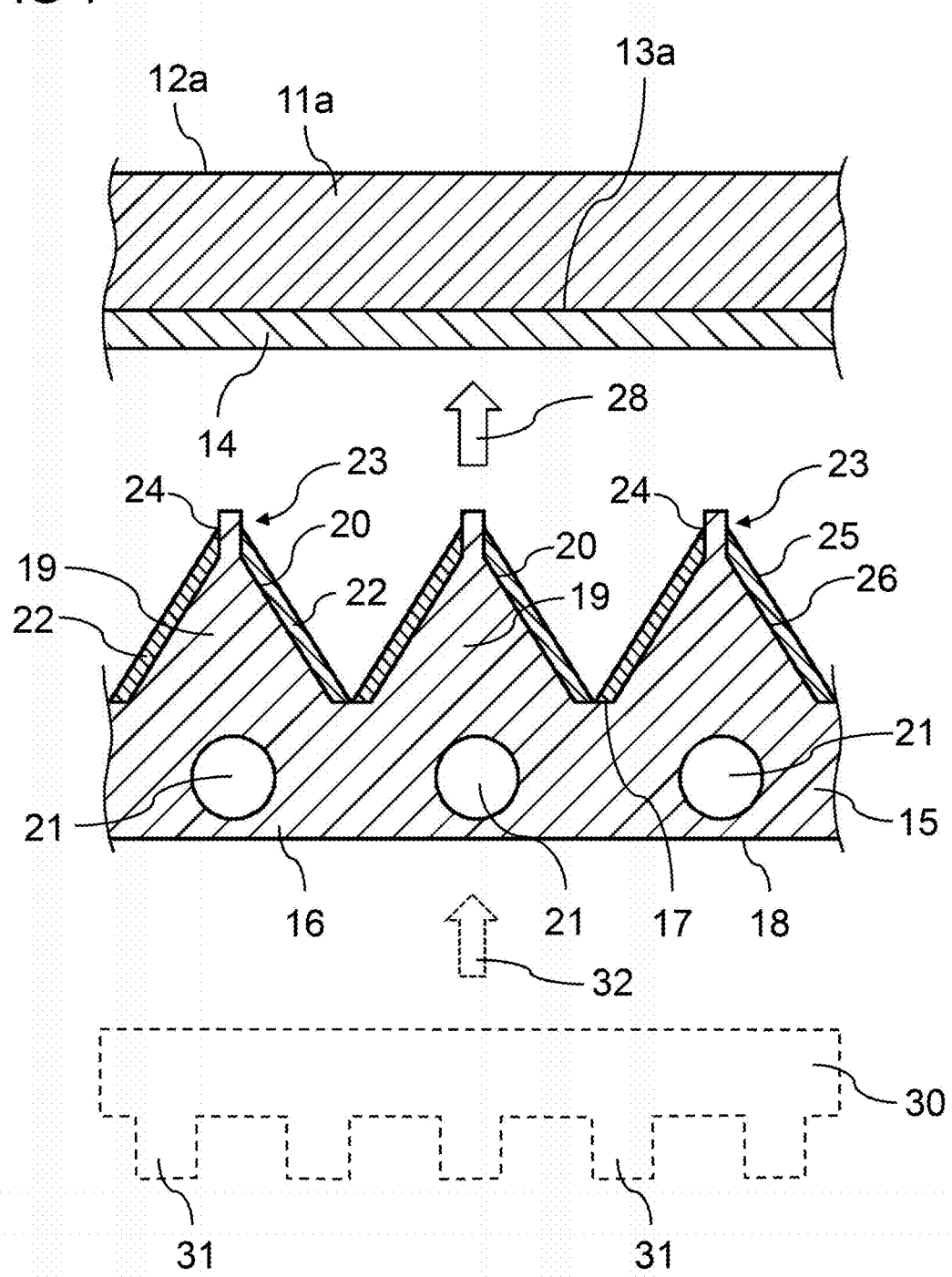

guiding element into a decorative material to form the decorative layer.

20 Claims, 8 Drawing Sheets

(51) Int. Cl.
*B60Q 3/72* (2017.01)
*B60Q 3/78* (2017.01)
*B60R 13/02* (2006.01)

(58) Field of Classification Search
USPC .......................................................... 362/511
See application file for complete search history.

(56) References Cited

U.S. PATENT DOCUMENTS

| | | | |
|---|---|---|---|
| 2015/0210226 A1* | 7/2015 | Topart .................... | B60K 37/20 |
| | | | 362/509 |
| 2015/0307033 A1* | 10/2015 | Preisler .................... | B60Q 3/20 |
| | | | 296/1.08 |
| 2017/0158122 A1* | 6/2017 | Haas ........................ | B60Q 3/14 |
| 2023/0347816 A1* | 11/2023 | Cuvillier .............. | G02B 5/0215 |

\* cited by examiner

FIG 5

SHAPED PART AND METHOD FOR PRODUCING A SHAPED PART

The invention relates to a shaped part and method for producing a shaped part, in particular this shaped part. The shaped part is in particular a decorative part (also: body trim part) and/or panel part designed as a shaped part for a vehicle interior.

Numerous decorative and panel parts are installed in the vehicle interior—for example, door panels, console panels, and instrument panels. The decorative and panel parts also include control buttons and their covers.

Such shaped parts comprise a decorative layer having a front side designed as a visible side and a rear side opposite the front side.

In order to display backlit or illuminated functional symbols on the front side of the decorative layer, it is known from DE 20 2018 101 500 U1 to incorporate light passages into the decorative layer. Light guide inserts made of a light-conducting material are inserted into these light passages. The light passages are illuminated by a light element.

The disadvantage of this known solution is that the light penetrates into the decorative layer upon illuminating the light passages, and thus the region around the light passage is also illuminated on the front side of the decorative layer. As a result, the sharpness of the edges of the illuminated regions on the front side is reduced, and a symbol to be displayed appears blurred.

The present invention is based upon the object of providing a new shaped part and a new method for producing a shaped part, in particular a shaped part and a method that at least partially eliminate the aforementioned disadvantages.

This object is achieved in terms of the shaped part by the features of claim 1 and in terms of the method by the features of claim 9 and by the features of claim 13. Advantageous embodiments and further developments are provided in each of the dependent claims.

The shaped part according to the invention comprises a decorative layer with a front side designed as a visible side and a rear side opposite the front side, a light-guiding element, and one or more light elements arranged in and/or on the light-guiding element, wherein light emanating from the light elements is conducted to the front side of the decorative layer via the light guide(s) of the light-guiding element.

The light-guiding element comprises a main body and one or more light guides protruding from the main body at a front side of the main body. With its front side, the main body is arranged on the rear side of the decorative layer, and the light guide(s) completely penetrate/s the decorative layer from the rear side to the front side.

The invention provides that a light-shielding layer be arranged between the surface of the light guide(s) and the decorative layer, wherein the light-shielding layer has, on the front side of the decorative layer on each light guide, an interruption through which light guided from the light guide(s) to the front side of the decorative layer can escape at the front side of the decorative layer.

The shaped part is in particular a decorative part (also: body trim part) and/or panel part designed as a shaped part for a vehicle interior.

The main body and/or the light guide(s) of the light-guiding element can be formed from a transparent or translucent material, in particular a transparent or translucent plastic, or comprise a transparent or translucent material, in particular a transparent or translucent plastic. The main body and the light guide(s) can, for example, be produced separately or together by means of an injection-molding process or a casting process.

The light-guiding element, in particular its one or more light guides, can extend exactly up to the interruption(s) in the light-shielding layer, in particular forming on the front side of the decorative layer a flat surface together with the material of the decorative layer. However, it is also possible that the light-guiding element, in particular one or more light guides, protrude through the interruption or interruptions in the light-shielding layer and rise above the material of the decorative layer. It is also possible that the light-shielding element and the light-guiding element, in particular one or more light guides, rise on the front side of the decorative layer above the material of the decorative layer.

The main body of the light-guiding element can form a carrier for the shaped part. In this case, there is no need for an additional carrier. However, it is also possible that a separate carrier be arranged on a rear side of the main body opposite the front side of the main body. Among other things, the carrier can be used to mount the shaped part on another body—for example, in a vehicle interior. For this purpose, the carrier can have attachment elements for mounting.

The light-shielding layer is a layer that prevents light from passing through it. In particular, the light-shielding layer is thus opaque.

The light-shielding layer prevents light from the light guide(s) of the light-guiding element from penetrating into the decorative layer and reaching the front side of the decorative layer. As a result, it is ensured that light can escape from the light guide(s) only in the interruption(s) on the front side of the decorative layer, thus enabling light to be emitted with sharp edges.

The light-shielding layer can be a light-shielding adhesive layer or a hardcoat coating, in particular a lacquered hardcoat coating. Here, it is provided that this adhesive layer or hardcoat be able to be applied to the light guide prior to the insertion of the light guides into the decorative layer.

However, it is also possible that the light-shielding layer be a light-shielding element, in particular a self-supporting and/or independently dimensionally stable light-shielding element. In this case, the light guide(s) and/or the light-guiding element can be molded onto the light-shielding element, in particular by means of injection molding. Alternatively, however, adhesive bonding is also possible, wherein in this case the light guide and/or light-guiding element are produced in advance.

The light-shielding element can be a one-piece element for all light guides. However, it can also involve a plurality of parts that are initially separate upon production and are only joined together in the finished shaped part via the light-guiding element.

In a further development, it is provided that the light-shielding element have one or more tips, in particular sharp-edged tips, on a side facing away from the main body of the light-guiding element. This tip or these tips are designed in particular to be pressed into the solid material of the decorative layer upon the production of the shaped part, thereby creating one or more continuous recesses (also: openings) through the decorative layer for the light guide(s).

One embodiment of the shaped part according to the invention provides that the light-shielding layer, in particular the light-shielding element, comprise or consist of metal and/or opaque plastic. The plastic can, for example, be a coated plastic.

The light-shielding layer can be reflective or mirrored towards the light guide(s). If the light-shielding layer is a light-shielding element, it can be provided with a reflective or mirror-like coating, for example. Due to these designs, little or no light is lost to absorption and/or scattering in the decorative material, and the light is guided through the light guide(s) with minimal or no loss.

A further development provides that the decorative layer consist of or comprise a decorative material, and the light-shielding layer, in particular the light-shielding element, consist of or comprise a first material and the light-guiding element consist of or comprise a second material, wherein the first material and/or the second material has a greater hardness and/or strength than the decorative material of the decorative layer. In one embodiment, the first material can also have a greater hardness and/or strength than the second material. In particular, the light-shielding layer, in particular the light-shielding element, thus represents a reinforcing layer for the light guide(s) of the light-guiding element.

According to one embodiment, the light guide(s) of the light-guiding element and/or the light-shielding layer, in particular the light-shielding element, have a shape that tapers towards the front side of the decorative layer, in particular a conical or funnel shape, at least in sections. The area of light passage of the light guide on the front side of the decorative layer is thus smaller than the light entry area of the light guide on the rear side of the decorative layer.

For example, the decorative layer can comprise or consist of a wood veneer, in particular a laminated wood veneer, the rear side of which is laminated with a fleece, for example. The decorative layer can also comprise or consist of plastic and/or film and/or paper and/or fabric and/or textile and/or leather and/or artificial leather and/or fleece and/or carbon and/or stone and/or a slate and/or marble and/or metals—for example, aluminum and/or stainless steel.

It can be provided that a transparent or translucent protective and/or optical layer be arranged on the front side of the decorative layer, wherein the protective and/or optical layer for example comprises lacquer or polyurethane (PUR) or plastic, or is formed from a lacquer or polyurethane (PUR) or plastic. For arranging a protective and/or optical layer made of PUR or plastic on the front side of the decorative layer, PUR or plastic, for example, is poured onto the front side.

The light element(s) arranged in and/or on the light-guiding element can be light sources, e.g., LED's, or elements comprising light sources. However, the light element (s) can also be or comprise light exit points of light guides, to which the light from remote light sources is guided via the light guides. For example, the light elements can be integrated and/or embedded in the light-guiding element, in particular the main body of the light-guiding element, or adhesively bonded to the light-guiding element, in particular its main body, and/or inserted into recesses in the light-guiding element, in particular its main body.

In particular, the light elements are arranged in or on the light-guiding element in such a way that light emanating from the light element(s) is guided to the front side of the decorative layer via the light guide(s) of the light-guiding element. For example, the light elements can be arranged in the main body of the light-guiding element and/or on the rear side of the main body of the light-guiding element and/or on the side of the main body of the light-guiding element. The arrangement can be effected in such a way that one light element is assigned to each light guide. In particular, the arrangement can be effected in such a way that the passage of light through each light guide of the light-guiding element can be effected separately, in particular independently of the passage of light through other light guides, so that the passage of light through the individual light guides can be controlled separately.

On the front side of the decorative layer, the light can be intended to display an indication and/or a symbol and/or a design, and/or to provide illumination.

A first method according to the invention for producing a shaped part relates to a shaped part that comprises a decorative layer with a front side designed as a visible side and a rear side opposite the front side, a light-guiding element, and one or more light elements arranged in and/or on the light-guiding element. The light-guiding element of this shaped part comprises a main body and one or more light guides protruding from the main body at a front side of the main body, wherein the main body is arranged with its front side at the rear side of the decorative layer, and the light guide(s) completely penetrate/s the decorative layer from the rear side to the front side. Light emanating from the light element(s) is guided to the front side of the decorative layer via the light guide(s) of the light-guiding element. With this shaped part, a light-shielding layer is arranged between the surface of the light guide(s) and the decorative layer, wherein the light-shielding layer has an interruption on the front side of the decorative layer on each light guide, so that the light guided by the light guide(s) to the front side of the decorative layer can escape at the front side of the decorative layer. The light-shielding layer of this shaped part is a self-supporting and/or independently dimensionally stable light-shielding element. In particular, the shaped part to be produced is the shaped part according to the invention described above in terms of further features.

The first method according to the invention comprises the following steps:

a) providing a decorative material for forming the decorative layer, wherein a front side of the decorative material is intended for forming the front side of the decorative layer, and a rear side of the decorative material is intended for forming the rear side of the decorative layer, b) providing the light-guiding element comprising a main body and one or more light guides protruding from a front side of the main body, c) providing the self-supporting and/or independently dimensionally stable light-shielding element with a front side and a rear side, wherein one or more free spaces for receiving the light guide(s) of the light-guiding element are formed on the rear side, d) inserting the decorative material and the light-shielding element into a pressing tool, wherein the front side of the light-shielding element faces the rear side of the decorative material, e) pressing the light-shielding element into the decorative material in such a way that the light-shielding element completely penetrates the decorative material from the rear side to the front side after pressing-in and demarcates one or more continuous recesses, formed by the pressing-in, in the decorative material towards the decorative material.

A self-supporting and/or independently dimensionally stable light-shielding element is understood in particular to be an element that can also be present and processed without additional layers or elements attached—for example, the light-guiding element.

The pressing-in provided with the first method according to the invention has the advantage that no openings have to be inserted in the decorative material in advance, and thus method steps in this regard are not required.

In a first embodiment of the first method according to the invention, it is provided that the light-guiding element be attached to the rear side of the light-sealing element prior to the insertion of the light-sealing element into the pressing tool according to step d). This attachment is effected in such a way that the light guide(s) of the light-guiding element is/are inserted into the free space(s) on the rear side of the light-sealing element and fills them completely, and thus the light-sealing element with the light-guiding element attached to its rear side is pressed into the decorative material according to step e). In particular, the light-shielding element thus provides a reinforcing layer for the light guide(s) of the light-guiding element upon pressing-in.

In a second, alternative embodiment of the first method according to the invention, it is provided that, after the pressing of the light-shielding element into the decorative material according to step e), the light-guiding element be attached to the rear side of the light-shielding element. This is effected in such a way that the light guide(s) of the light-guiding element are inserted into the free space(s) on the rear side of the light-shielding element and fill them completely.

A further development of the first method according to the invention provides that the light-shielding element to be provided according to step c) be produced by means of an injection-molding process and/or casting process and/or forming process and/or stamping process.

The light-shielding element can, for example, comprise or consist of metal and/or opaque plastic. The plastic can, for example, be a coated plastic.

A second method according to the invention for producing a shaped part relates to a shaped part that comprises a decorative layer with a front side designed as a visible side and a rear side opposite the front side, a light-guiding element, and one or more light elements arranged in and/or on the light-guiding element. The light-guiding element of this shaped part comprising a main body and one or more light guides protruding from the main body at a front side of the main body, wherein the main body is arranged with its front side at the rear side of the decorative layer, and the light guide(s) completely penetrate/s the decorative layer from the rear side to the front side. Light emanating from the light element(s) is guided to the front side of the decorative layer via the light guide(s) of the light-guiding element. In particular, the shaped part to be produced is the shaped part according to the invention described above.

The second method according to the invention comprises the following steps:

a) providing a decorative material for forming the decorative layer, wherein a front side of the decorative material is intended for forming the front side of the decorative layer, and a rear side of the decorative material is intended for forming the rear side of the decorative layer, b) providing the light-guiding element comprising a main body and one or more light guides protruding from a front side of the main body, c) inserting the decorative material and the light-guiding element into a pressing tool, wherein the front side of the main body of the light-guiding element faces the rear side of the decorative material, d) pressing the light guide(s) of the light-guiding element into the decorative material in such a way that the light guide(s) completely penetrate/s the decorative material after pressing-in.

The pressing-in provided with the second method according to the invention has the advantage that no openings have to be inserted in the decorative material in advance, and thus method steps in this regard are not required.

A further development of the second method according to the invention provides that a light-shielding layer be arranged on the surface of the light guide(s) of the light-guiding element to be provided according to step b), prior to the provision according to step b) or prior to the insertion into the pressing tool according to step c), wherein the light-shielding layer of each light guide has an interruption through which light can escape from the light guide(s). The arrangement of the light-shielding layer on the surface of the light guide(s) can, for example, be effected by coating or adhesive bonding.

The light-shielding layer can be a light-shielding adhesive layer or a hardcoat coating, in particular a lacquered hardcoat coating. Here, it is provided that this adhesive layer or hardcoat be able to be applied to the light guide prior to the insertion of the light guides into the decorative layer.

The light-shielding layer can also be a light-shielding element. The light-shielding element can have one or more sharp-edged tips on a side facing away from the main body of the light-guiding element. The light-shielding element can comprise or consist of metal and/or opaque plastic.

The light-shielding layer can be reflective or mirrored towards the light guide(s). In the case of the design as a light-shielding element, this light-shielding element can be provided with a reflective or mirror-like coating.

With all of the aforementioned methods according to the invention, pressing-in can be effected by inserting on the front side of the decorative material an insert into the pressing tool. The insert can be a softer material than the material of the light-shielding element and/or the material of the light-guiding element. For example, it can be a cardboard, foam, or fleece. As a result, it is enabled that the light-shielding element and/or the light-guiding element can project beyond the front side of the decorative material upon pressing, by pushing these materials into the insert. The same applies to material displaced upon pressing. After pressing, the insert can be removed from the front side of the decorative material, in particular peeled off. Enabling overhangs upon pressing supports the complete penetration of the decorative material through the light-shielding element and/or the light-guiding element from the rear side to the front side of the decorative material.

One embodiment of the method according to the invention provides that the front side of the decorative material be ground and/or brushed off after pressing-in. Due to this grinding and/or brushing process, any overhang of the light-shielding element and/or the light-guiding element and/or any decorative material pressed out upon pressing-in is removed.

In all methods according to the invention, the decorative material provided can consist of one or more decorative layers. For example, the decorative material can comprise or consist of a wood veneer, in particular a laminated wood veneer, the rear side of which is laminated with a fleece, for example. The decorative material can also comprise or consist of plastic and/or film and/or paper and/or fabric and/or textile and/or leather and/or artificial leather and/or fleece and/or carbon and/or stone and/or a slate and/or marble and/or metals—for example, aluminum and/or stainless steel.

The decorative material can be processed and thus shaped by surface processes prior to and/or after pressing-in, e.g., by coloring processes and/or by using a wiping stain and/or by grinding processes and/or by polishing processes and/or by etching processes.

A further development provides that the light-shielding layer, in particular the light-shielding element, consist of a first material and the light-guiding element consist of a second material, wherein the first material and/or the second material has a greater hardness and/or strength than the decorative layer or decorative layers of the decorative material. Furthermore, it can be provided that the first material have a greater hardness and/or strength than the second material. In particular, the light-shielding layer, in particular the light-shielding element, in this case represents a reinforcing layer for the light guide(s) of the light-guiding element.

One embodiment of the method according to the invention provides that the decorative material provided be provided with an adhesive layer on its rear side, in particular by means of lamination, prior to insertion into the pressing tool. After the insertion of the light-guiding element, the front side of the main body of the light-guiding element adheres to the adhesive layer, and thus the light-guiding element adheres to the decorative material.

A further development of the methods according to the invention provides that the light guide(s) of the light-guiding element and/or the light-shielding layer, in particular the light-shielding element, have a tapered shape, in particular a conical or funnel shape, at least in sections. If the light-shielding layer is a light-shielding element, it can be provided that the light-shielding element have one or more tips, in particular sharp-edged tips, which are designed in particular to be pressed into the decorative material upon the production of the shaped part, and thereby create one or more openings through the decorative material for the light guide(s) of the light-guiding element. The aforementioned measures support the pressing-in.

According to one embodiment of the methods according to the invention, the light-guiding element to be provided is produced in one piece, wherein the light element(s) is/are arranged in and/or on this one-piece light-guiding element, in particular in and/or on the main body of the light-guiding element. The main body and the light guide(s) of the light-guiding element can in particular be produced together in one production step. For example, the one-piece light-guiding element comprising the main body and light guide can be produced by means of an injection-molding process or a casting process. Here, the light element(s) can be embedded upon injection molding or casting, or adhesively bonded afterwards and/or inserted into recesses in the main body.

According to an alternative embodiment of the methods according to the invention, the main body and the light guide(s) of the light-guiding element to be provided are produced separately and subsequently joined together, in particular by means of adhesive, wherein the light element(s) is/are arranged in and/or on the main body. For example, both the main body and the light guide(s) can be produced by means of an injection-molding process or a casting process. Here, the light element(s) can be embedded in the main body upon injection molding or casting, or subsequently adhesively bonded to the main body and/or inserted into recesses in the main body, wherein the adhesive bonding and/or insertion can be effected prior to or after or simultaneously with the connection of the main body to the light guide(s).

In all embodiments, the light-guiding element with the light elements has the advantage that an integrated lighting system with light elements embedded in or arranged on a body of the desired shape is present. As a result, production is simplified.

A further development of the method according to the invention provides that a carrier be attached to a rear side, opposite the front side, of the main body of the light-guiding element. In particular, the carrier has connecting elements for mounting the finished shaped part on another body—for example, in a vehicle interior. The attachment of the carrier can be effected prior to or after the provision of the light-guiding element and/or prior to or after the insertion of the light-guiding element into the decorative material. In the event of the separate production of the main body and light guides, the carrier can also be attached prior to or after the connection of the main body and light guides.

The carrier can be manufactured as an individual part in advance, e.g., by injection molding, and adhesively bonded to the rear side of the main body, for example. However, it is also possible to inject the carrier onto the rear side of the main body.

Alternatively, it is also possible that the light-guiding element itself be designed as a carrier and enable the mounting of the shaped part by means of attachment elements. In this case, the attachment of a carrier is not necessary and can be omitted.

One embodiment of the method according to the invention provides that a transparent or translucent protective and/or optical layer be applied to the front side of the decorative material. This is preferably effected after pressing-in. Upon a grinding or brushing of the front side of the decorative material, this application of a protective and/or optical layer is effected after pressing-in and subsequent grinding and/or brushing.

The protective and/or optical layer can, for example, comprise lacquer or polyurethane (PUR) or plastic, or be formed from a lacquer or polyurethane (PUR) or plastic. For arranging a protective and/or optical layer made of PUR or plastic on the front side of the decorative layer, PUR or plastic, for example, is poured onto the front side.

Figure 2:
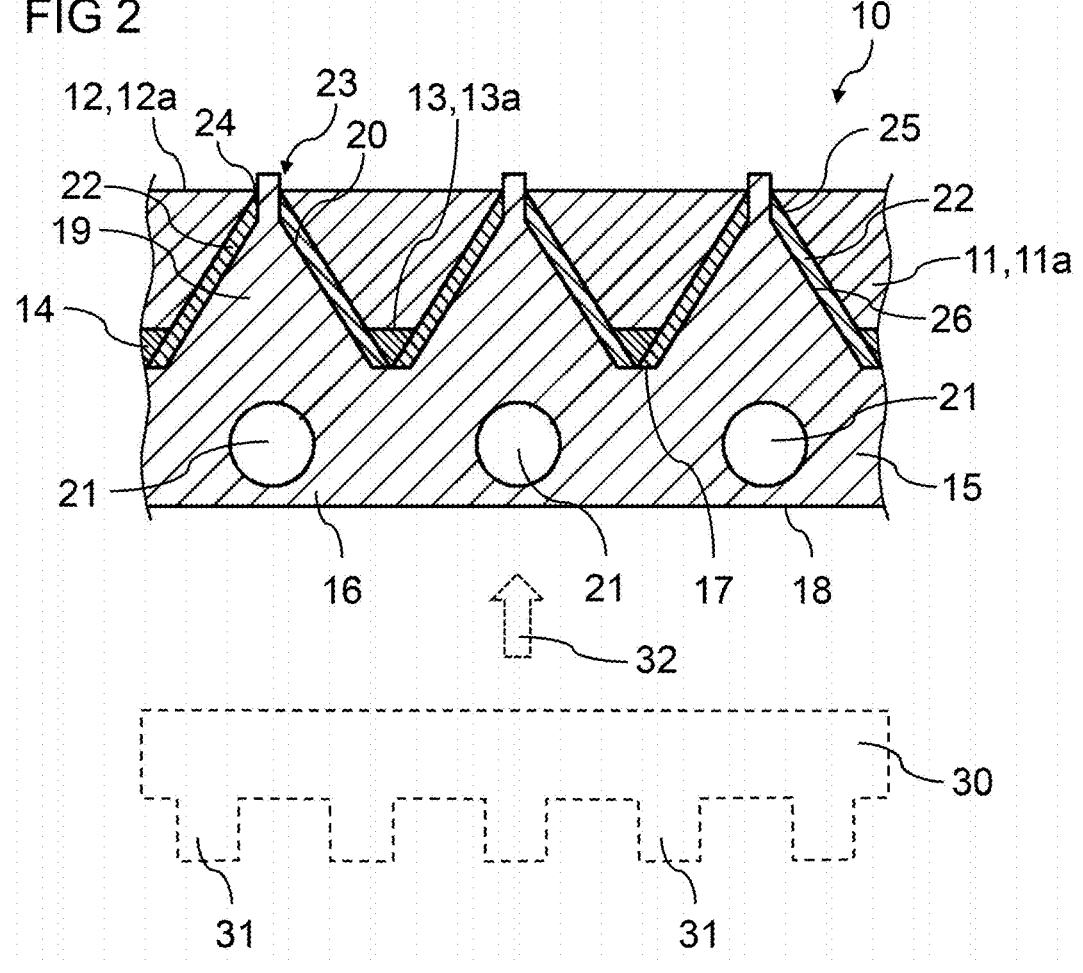
Figure 3:
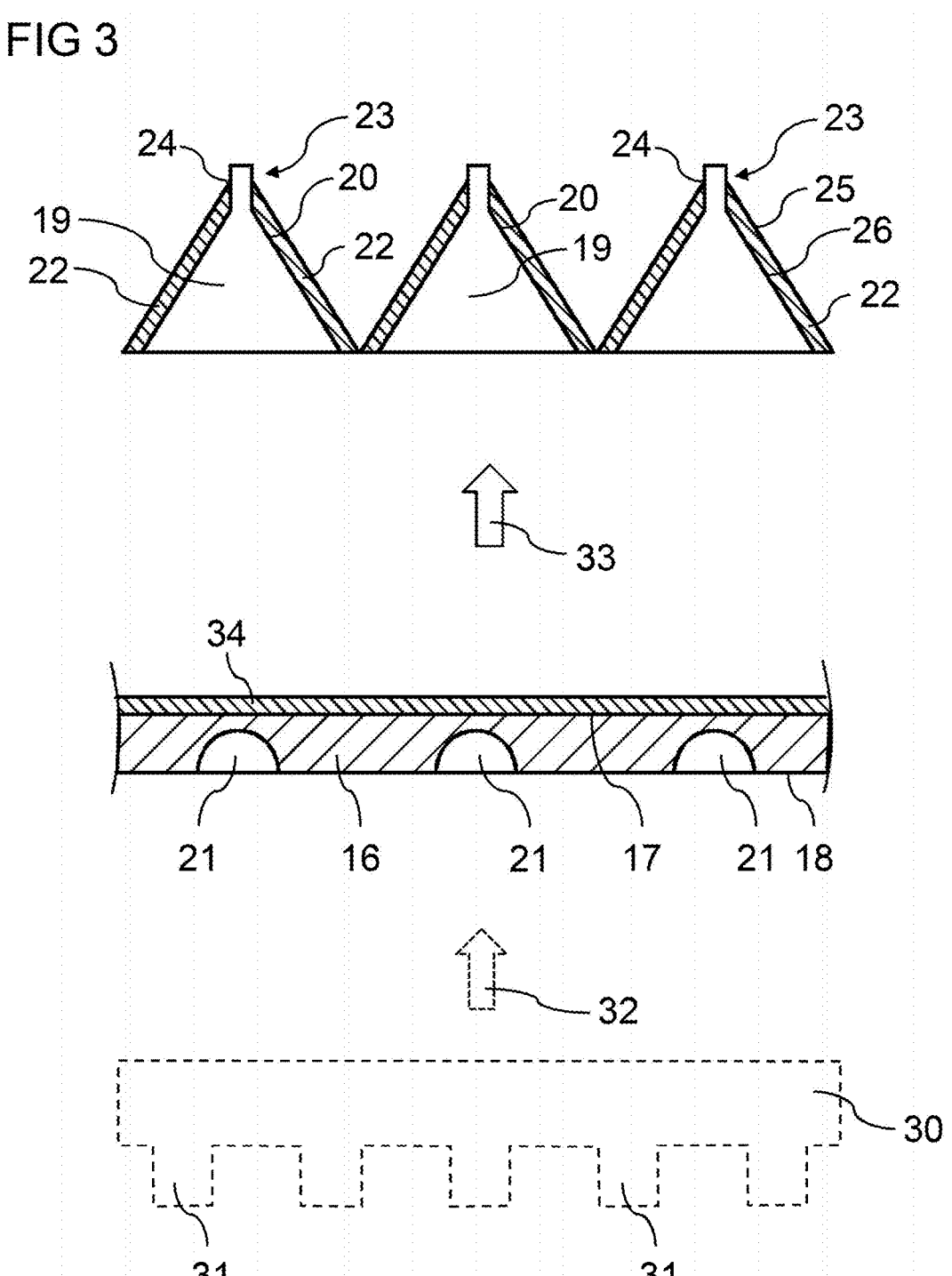
Figure 4:
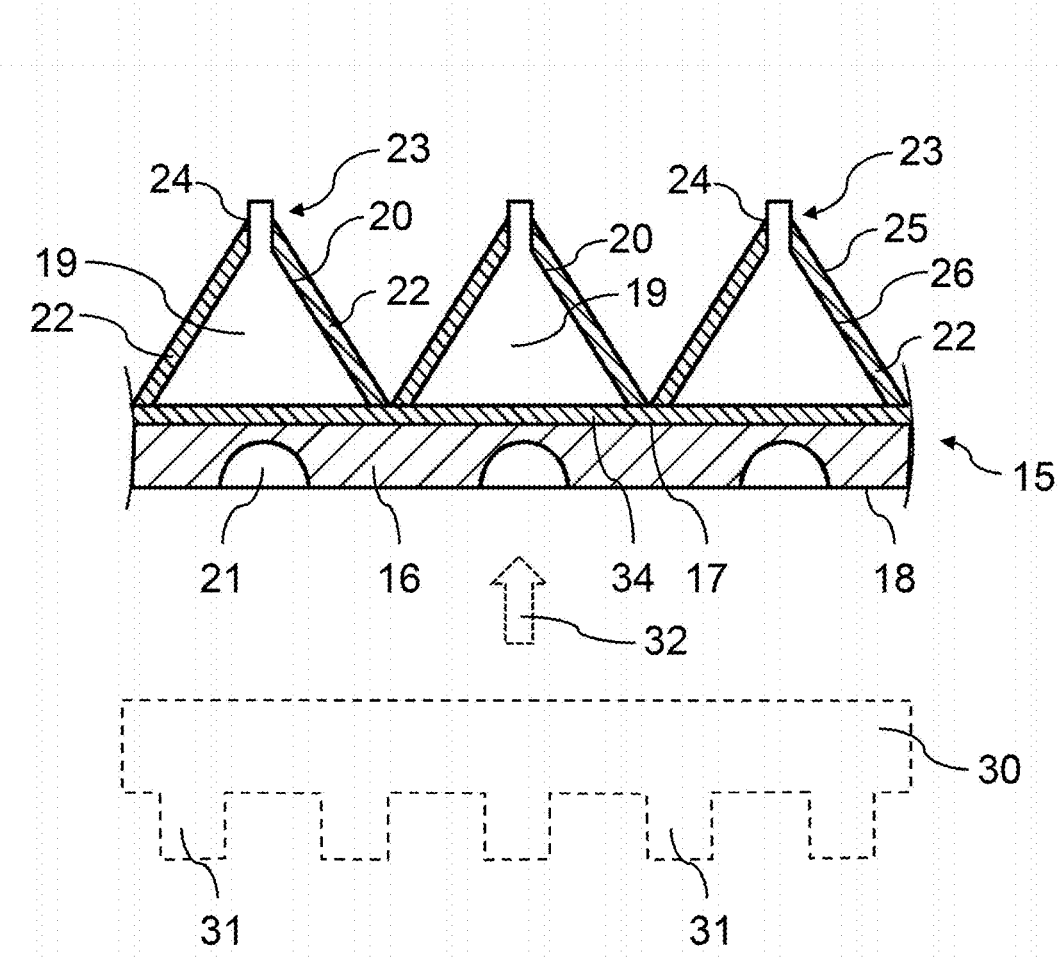
Figure 6:
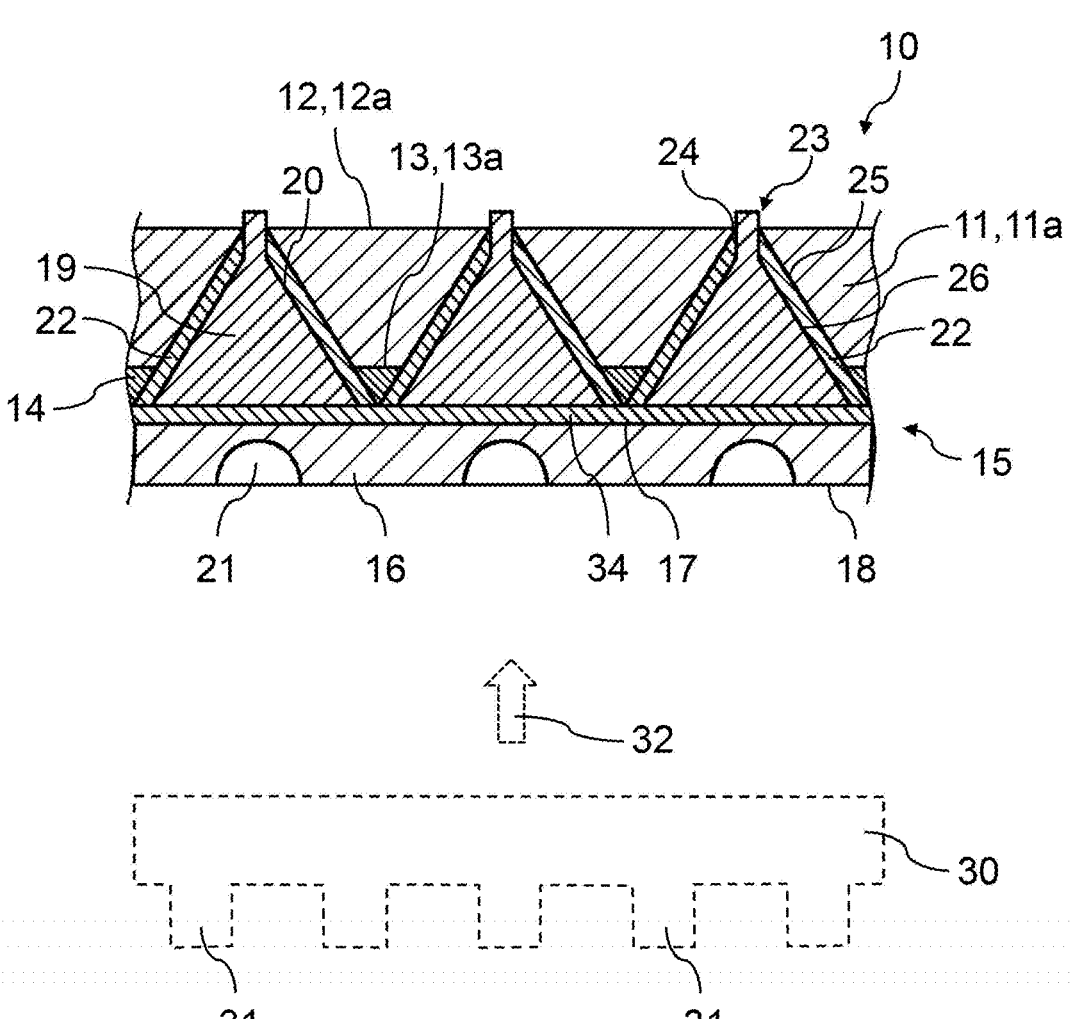
Figure 7:
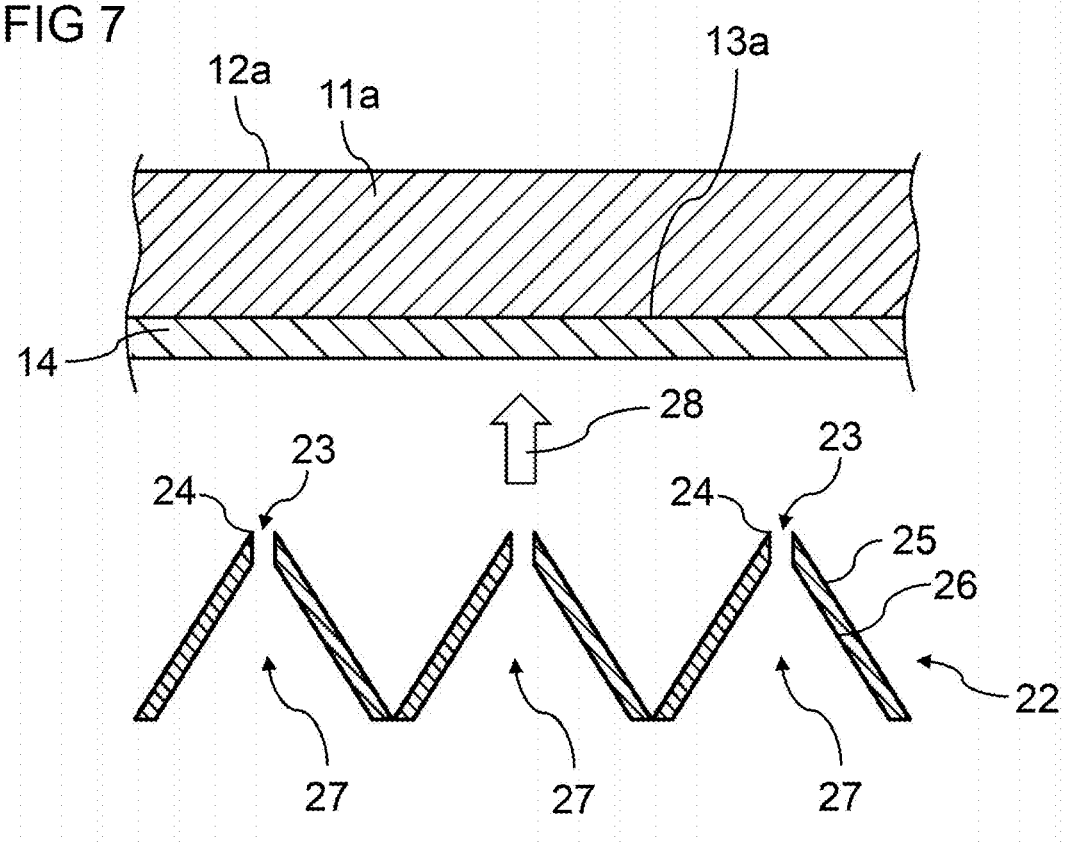
Figure 8:
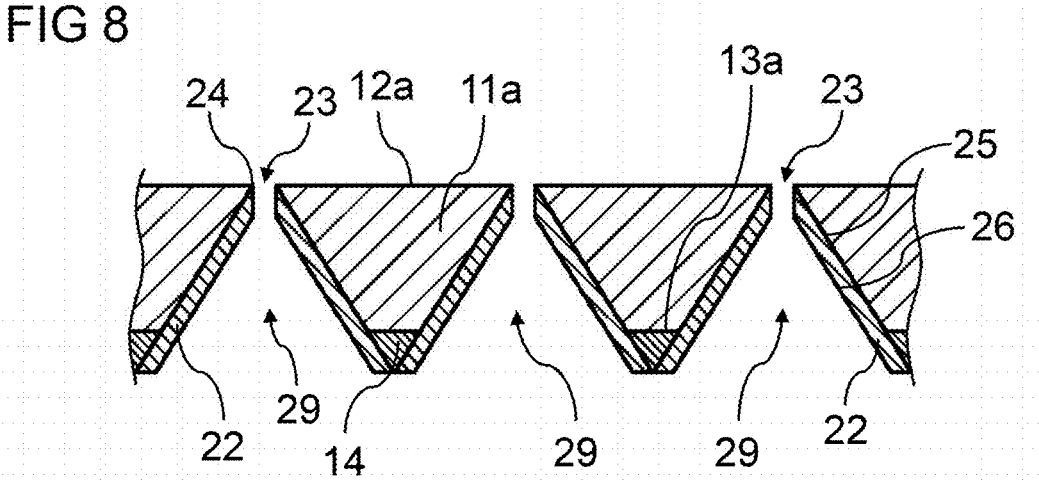
Figure 9:
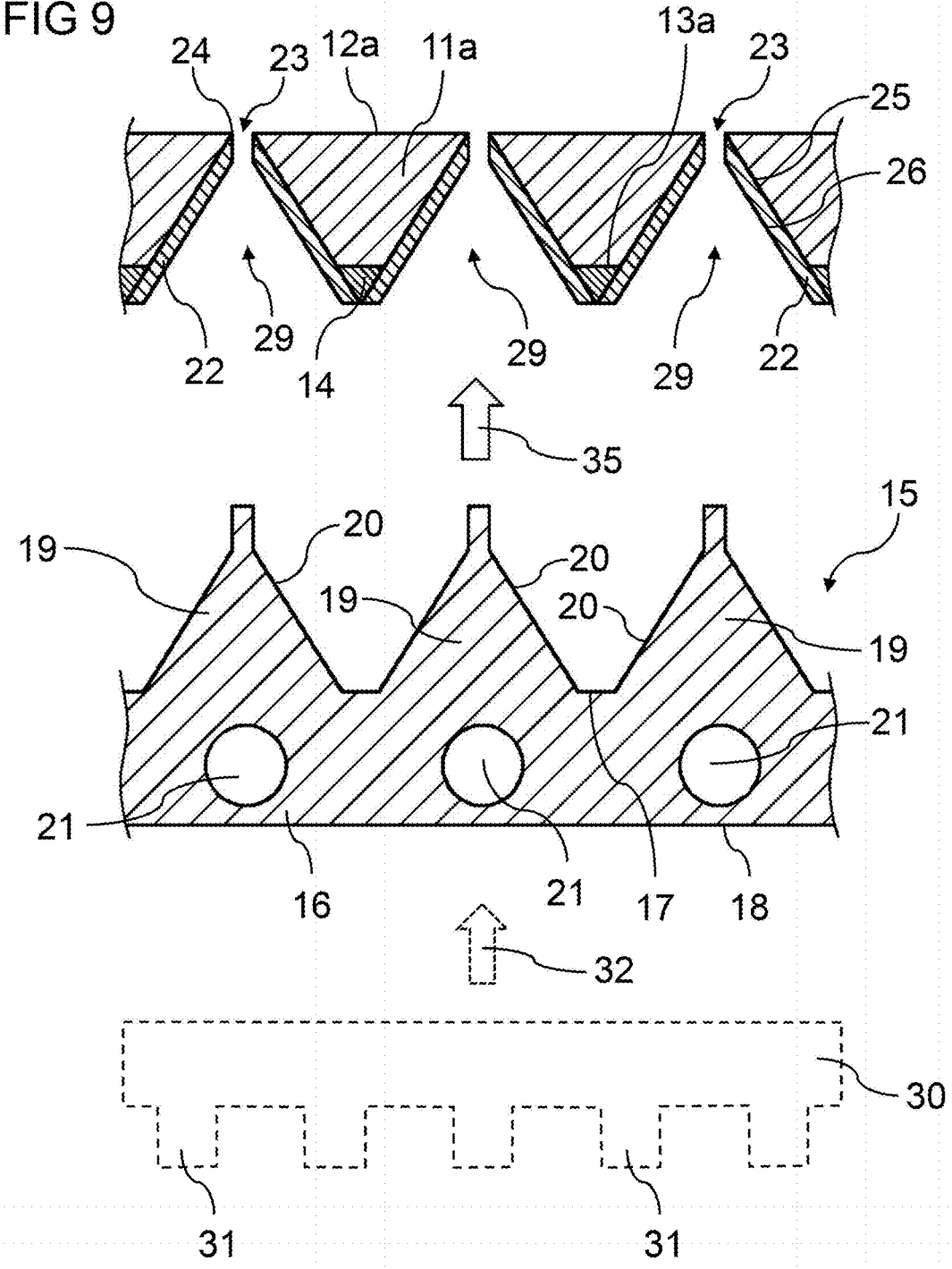

The invention is explained in more detail below also with regard to further features and advantages on the basis of the description of embodiments and with reference to the accompanying schematic drawings, In the drawings:

FIG. 1 shows a first exemplary embodiment of a method according to the invention for producing a shaped part according to the invention, FIG. 2 shows a first exemplary embodiment of a shaped part according to the invention, produced according to the method according to FIG. 1 or according to the method according to FIGS. 7 to 9, FIG. 3 shows, as part of a second exemplary embodiment of a method according to the invention for producing a shaped part according to the invention, a method for producing a two-part light element, FIG. 4 shows the two-part light element with light-shielding layer produced using the method according to FIG. 3, FIG. 5 shows a further method step of the second exemplary embodiment of a method according to the invention for producing a shaped part according to the invention, using the light element with light-shielding layer according to FIG. 4, FIG. 6 shows a second exemplary embodiment of a shaped part according to the invention, produced according to the method according to FIG. 3 to FIG. 5, FIG. 7 shows, as part of a third exemplary embodiment of a method according to the invention for producing a shaped part according to the invention, the pressing of a light-shielding element into decorative material, FIG. 8 shows the intermediate product produced by the method according to FIG. 7 comprising decorative material and pressed-in light-shielding element, and FIG. 9 shows a further method step of the third exemplary embodiment of a method according to the invention for the production of a shaped part according to the invention, using the intermediate product according to FIG. 8.

Corresponding parts and components are also identified with the same reference signs in each of the various exemplary embodiments.

FIG. 2 and FIG. 6 show a first and a second exemplary embodiment of a shaped part 10 according to the invention. In both exemplary embodiments, the shaped part 10 comprises a decorative layer 11 with a front side 12 designed as a visible side and a rear side 13 opposite the front side 12. Furthermore, the shaped part 10 comprises a light-guiding element 15 comprising a main body 16 and a plurality of light guides 19, protruding from the main body 16, at a front side 17 of the main body 16.

With its front side 17, the main body 16 is arranged on the rear side 13 of the decorative layer 11. For this purpose, an adhesive layer 14 is provided in both exemplary embodiments, by means of which the main body 16 is adhesively bonded to the decorative layer 11. In the second exemplary embodiment according to FIG. 6, an adhesive 34 is additionally arranged between the main body 16 and the decorative layer 11.

The light guides 19 completely penetrate the decorative layer 11 from the rear side 13 to the front side 12.

In the first exemplary embodiment according to FIG. 1, the light-guiding element 15 comprising main body 16 and light guide 19 is produced in one piece. In contrast to this, in the second exemplary embodiment according to FIG. 6, the main body 16 and the light guides 19 of the light-guiding element 15 are produced separately and subsequently joined together. This can be seen based upon the adhesive 34 shown in FIG. 6, which forms an adhesive layer on the front side 17 of the main body for connecting the light guides 19.

Furthermore, the shaped part 10 comprises a plurality of light elements 21 in both exemplary embodiments. In the first exemplary embodiment according to FIG. 1, these light elements 21 are integrated into the main body 16 of the light-guiding element 15 by being completely embedded in the material of the main body 16. In the second exemplary embodiment according to FIG. 6, the light elements 21 are arranged on the main body 16 of the light-guiding element 15, specifically in recesses on a rear side 18, opposite the front side 17, of the main body 16. In both cases, the arrangement of the light elements 21 is effected in such a way that light emanating from the light elements 21 is guided via the light guides 19 of the light-guiding element 15 to the front side 12 of the decorative layer 11, in order to, for example, display a symbol or decoration there or to provide illumination.

In both exemplary embodiments, a light-shielding layer 22 is arranged between the surface 20 of the light guide 19 and the decorative layer 11. The light-shielding layer 22 can be a self-supporting and/or independently dimensionally stable light-shielding element. A front side 25 of the light-shielding element 22 is adjacent to the decorative layer 11, and a rear side 26 of the light-shielding element 22 is adjacent to the light guide 19.

The main body 16 and the light guides 19 of the light-guiding element 15 are designed to be transparent or translucent, in order to transmit the light with as little loss as possible. This also applies to adhesive 34. On the other hand, the light-shielding layer 22 is opaque and thus prevents light from the light guides 19 from entering the decorative layer 11. For example, the light-shielding layer 22 can comprise or consist of metal and/or opaque plastic. The light-shielding layer 22 can also be reflective or mirrored towards the light guides 19.

In both exemplary embodiments, the light-shielding layer 22 on the front side 12 of the decorative layer 11 has on each light guide 19 an interruption 23, through which light guided from the light guides 19 to the front side 12 of the decorative layer 11 can escape at the front side 12 of the decorative layer 11. These interruptions 23 are penetrated by the light guides 19 assigned in each case, wherein the light guides 19 protrude beyond the front side 12 of the decorative layer 11 in the examples shown. This protrusion can, for example, be ground off afterwards, so that a flat visible side of the shaped part 10 results. Furthermore, a transparent or translucent protective and/or optical layer can be applied to the front side 12 of the decorative layer (not shown in the figures).

In order to simplify production by means of pressing-in, the light guides 19 of the light-guiding element 15 and the light-sealing layer 22 in both exemplary embodiments have a shape that tapers in sections towards the front 12 of the decorative layer 11. Furthermore, the light-shielding element 22 has one or more tips 24 on a side facing away from the main body 16 of the light-guiding element 15, which facilitate penetration into the decorative layer 11, and thus pressing-in.

The decorative layer 11 consists of a decorative material 11a or comprises a decorative material 11a. The light-shielding layer 22 consists of or comprises a first material, and the light-guiding element 15 consists of or comprises a second material. The first material and/or the second material have a greater hardness and/or strength than the decorative material 11a of the decorative layer 11. Furthermore, it can be provided that the first material have a greater hardness and/or strength than the second material, and thus the light-shielding layer 22 constitute a reinforcing layer for the light guides 19 of the light-guiding element 15.

In both exemplary embodiments according to FIG. 2 and FIG. 6, in each case a carrier 30 can additionally be attached to the rear side 18 of the main body 16 of the light-guiding element 15, wherein the process of attachment (reference sign 32) is shown in the figures in each case. However, the carrier 30 may also have been attached at an earlier point in time. The carrier 30 has attachment elements 31 for mounting the shaped part 10 on a further body—for example, in a vehicle interior. The carrier 30 and its attachment 32 are shown in dashed lines in order to illustrate that the shaped part 10 does not necessarily require this carrier 30. Alternatively, it is also possible to provide that the light-guiding element 15, in particular its main body 16, form a carrier for the shaped part 10, which enables the mounting of the shaped part 10 on a further body.

A first exemplary embodiment of a method according to the invention, which is used to produce the shaped part 10 shown in FIG. 2, is shown in FIG. 1. A decorative material 11a is provided, which is intended for forming the decorative layer 11 in the shaped part 10 to be produced. Here, a front side 12a of the decorative material 11a is intended to form the front side 12 of the decorative layer 11 of the shaped part 10, and a rear side 13a of the decorative material 11a is intended to form the rear side 13 of the decorative layer 11 of the shaped part 10. An adhesive layer 14 is attached from the rear side 13*a* of the decorative material 11*a*. The decorative material 11*a* provided is shown in the upper region in FIG. 1.

A light-guiding element 15 is also provided. This light-guiding element 15 is formed in one piece, e.g., by means of an injection-molding process and/or casting process, and comprises a main body 16 and one or more light guides 19, which protrude from a front side 17 of the main body 16 and taper with increasing distance from the main body 16. Several light elements 21 are embedded in the main body 16 of the light-guiding element 15, wherein one light element 21 is assigned to each light guide 19 in the example shown. The main body 16 and the light guide 19 are designed to be transparent or translucent.

A light-shielding layer 22 is arranged on the surface 20 of the light guide 19 of the light-guiding element 15. Here, this can be a coating. However, in the present case, it is a self-supporting and/or independently dimensionally stable light-shielding element 22 with a front side 25 and a rear side 26. The rear side 26 of the light-shielding element 22 is in contact with the surface 20 of the light guide 19. Accordingly, the light-separating element 22 also forms sections that taper with increasing distance from the main body 16. The light-shielding element 22 forms tips 24 in the most protruding regions. The light-shielding element 22 has interruptions 23 between these tips 24. The light guides 19 completely fill the free space, resulting from the taper, at the rear side of the light-shielding element 22. Furthermore, each light guide 19 fills one of the interruptions 23, penetrates through it, and protrudes from it. Apart from the interruptions 23, the light-shielding element 22 completely covers the surface 20 of the light guides 19 and prevents light from the light elements 21 from escaping from the light guides 19 via the surface 20. The light from the light elements 21 can thus escape only in the region of the interruptions 23 in the light-shielding element 22.

The arrow 28 illustrates the method step of pressing-in. For this purpose, the provided decorative material 11*a* and the composite of light-shielding element 22 and light-guiding element 15 are inserted into a pressing tool (not shown), wherein—as shown in FIG. 1—the front side 25 of the light-shielding element 22 faces the rear side 13 of the decorative material 11. Subsequently, as shown by the arrow 28, the light-shielding element 22 is pressed into the decorative material 11*a* with the light-guiding element 15 arranged on the rear side.

The result of this pressing-in is shown in FIG. 2 described above. Upon production, the light-shielding element 22 and the light guides 19 penetrate the decorative material 11*a* completely from the rear side 13*a* to the front side 12*a* after pressing-in 28. The decorative material 11*a* is displaced in this region, and the resulting recesses in the decorative material 11*a* are completely demarcated by the light-shielding element 22 from the light guides 19 arranged on the rear side 25 of the light-shielding element 22. Thus, no light can penetrate from the light guides 19 into the decorative material 11*a*. The light guides 22 protrude at the interruptions 23 beyond the front side 12*a* of the decorative material 11*a*. These projections can be ground off in subsequent method steps. If necessary, the front side 11*a* can also be coated with a transparent or translucent protective and/or optical layer (not shown).

In FIG. 1, it is indicated by stitched lines that a carrier 30 can be attached to the rear side 18 of the main body 16 of the light-guiding element 15. The arrow 32 illustrates this optional method step. This optional attachment of the carrier 30 can be effected prior to the pressing-in or at the same time as the pressing-in. In this case, the carrier 30 in FIG. 2 must be added as a fixed component of the shaped part. Alternatively, the carrier 30, if it is provided at all, can also be attached only after the pressing-in, as indicated by the dashed lines in FIG. 2. The carrier 30 enables the mounting of the shaped part 10 on other bodies, e.g., in a vehicle interior; symbolic attachment elements 31 are shown in the figures for this purpose. Without the attachment of a carrier 30, the main body 16 of the light-guiding element 15 assumes the carrier function of the shaped part 10 and enables, for example, the mounting of the shaped part 10.

A second exemplary embodiment of a method according to the invention, which is used to produce the shaped part 10 shown in FIG. 6, is shown in FIG. 3 to FIG. 5. A key difference from the first exemplary embodiment is that the light-guiding element 15 is not produced in one piece, but that the main body 16 and light guide 19 are initially produced separately. Initially, the unit shown in FIG. 3 above comprising the light-shielding layer 22—here, in turn, a self-supporting and/or independently dimensionally stable light-shielding element 22—and light guides 19 attached thereto is provided, wherein the rear side 26 of the light-shielding element 22 is in contact with the surface 20 of the light guides 19, analogously to the descriptions in the first exemplary embodiment described above. Furthermore, the separately produced main body 16 is provided, which is shown in the center in FIG. 3. In the case shown, the light elements 21 are arranged in recesses on the rear side 18 of the main body 16. The front side 17 of the main body 16 is provided with transparent or translucent adhesive 34, which forms an adhesive layer for attaching the light guides 17. The arrow 33 illustrates the method step of connecting the main part 16 and the light guides 17, with the light-shielding element 22 attached to them. For this purpose, the main part 16 and the light guide 17 are pressed together, as illustrated by the arrow 33 in FIG. 3.

In FIG. 3, it is in turn indicated by stitched lines in the lower region of the illustration that a carrier 30 can be attached to the rear side 18 of the main body 16 of the light-guiding element 15. The arrow 32 in turn illustrates this optional method step. This optional attachment of the carrier 30 can be effected prior to, upon, or after the connection of the main part 16 and the light guides 19.

FIG. 4 shows the light-guiding element 15 produced and now assembled using the method described above and shown in FIG. 3, with a light-shielding element 22 attached thereto. The connection is established via the adhesive 34. If a carrier 30 has already been attached prior to or upon the connection of the main part 16 and the light guides 19, the carrier 30 must already be added as a fixed component in FIG. 4. Alternatively, the carrier 30, if it is provided at all, can also be attached only after the connection of the main part 16 and the light guides 17, as indicated by dashed lines in FIG. 4.

Figure 5:
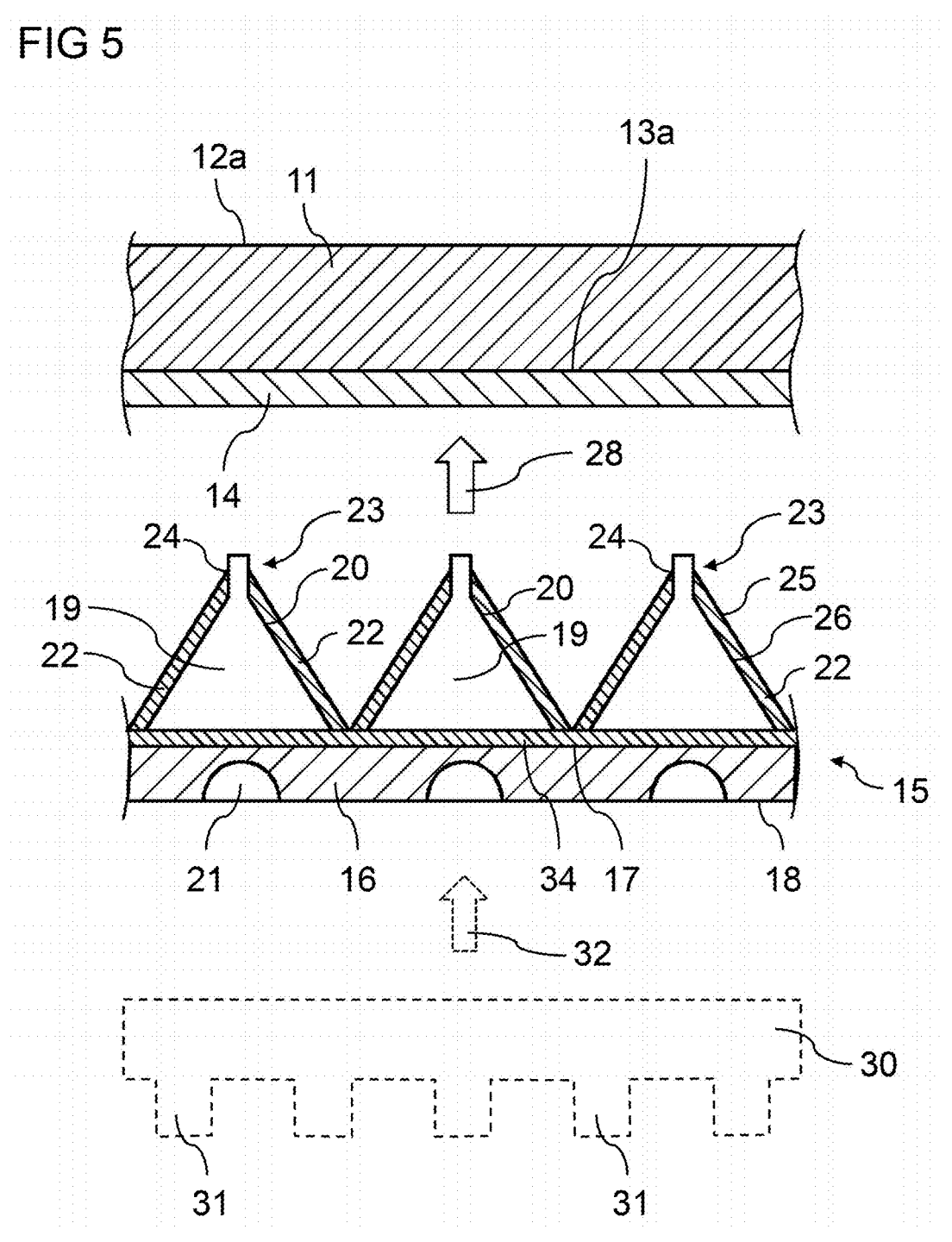

FIG. 5 shows as a further method step the pressing-in of the assembled light-guiding element 15 shown in FIG. 4 with the light-shielding element 22 attached thereto into the provided decorative material 11 with attached adhesive layer 14. This method step corresponds to the corresponding method step of the first exemplary embodiment, which was described above with reference to FIG. 1. For this purpose, reference is made to further details of this method step. If no carrier 30 has yet been attached, the explanations regarding the optional attachment of the carrier 30 also apply accordingly. FIG. 6 shows the shaped part 10 after pressing-in. For further details, also in terms of the optional attachment of the carrier 30, reference is made to the explanations above with regard to FIG. 2 and also to FIG. 6.

A third exemplary embodiment of a method according to the invention, which also serves to produce the shaped part 10 shown in FIG. 2, is shown in FIG. 7 to FIG. 9. A difference from the second exemplary embodiment is that the light-guiding element 15 is here in turn produced in one piece analogously to the first exemplary embodiment, and not separately after main body 16 and light guides 17; see FIG. 9. A further key difference is that, initially, only the light-shielding element 22 is pressed into the decorative material, without the light guide 19 attached thereto. This is illustrated in FIG. 7.

Thus, as shown in FIG. 7, a self-supporting and/or independently dimensionally stable light-shielding element 22 is initially provided, the design of which corresponds to the light-shielding elements 22 already described with reference to the preceding figures, such that reference is made to these explanations. A decorative material 11*a* with adhesive layer 14 is also provided, analogously to the first and second exemplary embodiments. However, in contrast to the first exemplary embodiment, in this case the free-standing light-shielding element 22 is pressed into the decorative material 11*a* without a light-guiding element 15 attached thereto, i.e., with free spaces 27 on its rear side 26.

As a result, the component shown in FIG. 8, consisting of decorative material 11*a* and pressed-in light-shielding element 22, is produced. The light-shielding element 22 penetrates the decorative material 11*a* after pressing-in 28 completely from the rear side 13*a* to the front side 12*a*. The decorative material 11*a* is displaced in this region, resulting in recesses 29 in the decorative material 11*a*. These recesses 29 are completely demarcated by the light-sealing element 22. Thus, no light can penetrate the decorative material 11*a* from the recesses 29. On the front side 12*a* of the decorative material 11*a*, the interruptions 23 in the light-shielding element 22 form passages for light.

FIG. 9 shows as the next method step, illustrated by the arrow 35, the attachment of the light-guiding element 15—in this case, produced in one piece—with integrated light elements 21 to the component shown in FIG. 8. The structure of the light-guiding element 15 corresponds to the light-guiding element 15 described with reference to FIG. 1, such that reference is made to these explanations above for further details. The light guides 19 of the light-guiding element 15 are inserted into the recesses 29 and fill them completely. The surface 20 of the light guide 19 is in contact with the rear side 26 of the light-shielding element 22. Furthermore, the light guides 19 penetrate the interruptions 23 and protrude from the front side 12*a* of the decorative material 11*a*. Thus, the shaped part 10 already described above and shown in FIG. 2 results, for further details of which reference is made to the explanations above. The light-shielding element 22, which prevents light from the light guides 19 from penetrating into the decorative material 11*a*, is of central importance. Rather, the light from the light guides 19 can escape only at the interruptions 23. The light guides 19 protruding at the interruptions 23 can in turn be ground down in subsequent method steps. If necessary, the front side 11*a* can also be coated with a transparent or translucent protective and/or optical layer (not shown).

The optional attachment of a carrier 30 is in turn shown by dashed lines in FIG. 9. This attachment can be done prior to, upon, or after the attachment of the light-guiding element 15 to the light-shielding element 22.

LIST OF REFERENCE SIGNS

10 Shaped part
11 Decorative layer

11*a* Decorative material
12 Front side of the decorative layer 11
12*a* Front side of the decorative material 11*a*
13 Rear side of the decorative layer 11
13*a* Rear side of the decorative material 11*a*
14 Adhesive layer
15 Light-guiding element
16 Main body
17 Front side of the main body 16
18 Rear side of the main body 16
19 Light guide
20 Surface of the light guide 19
21 Light element
22 Light-shielding layer, light-shielding element
23 Interruption in the light-shielding layer 22 or the light-shielding element 22
24 Tip of the light-shielding element 22
25 Front side of the light-shielding element 22
26 Rear side of the light-shielding element 22
27 Free space on the rear side 26 of the light-shielding element 22
28 Pressing-in
29 Recess in decorative material 11*a*
30 Carrier
31 Attachment element of the carrier 30
32 Attachment of the carrier 30
33 Connection of the main part 16 and light guides 19
34 Adhesive
35 Attachment of the light-guiding element 15 to the light-shielding element 22

The invention claimed is:

1. A shaped part comprising
a decorative layer having a front side designed as a visible side and a rear side opposite the front side,
a light-guiding element comprising a main body and one or more light guides protruding from the main body at a front side of the main body, wherein the main body is arranged with its front side at the rear side of the decorative layer, and the one or more light guides completely penetrate/s the decorative layer from the rear side to the front side, and
one or more light elements arranged in and/or on the light-guiding element, wherein light emanating from the light elements is guided to the front side of the decorative layer via the one or more light guides of the light-guiding element,
characterized in that
a light-shielding layer is arranged between the surface of the one or more light guides and the decorative layer, wherein the light-shielding layer has, on the front side of the decorative layer on each light guide, an interruption through which light guided by the one or more light guides to the front side of the decorative layer can escape at the front side of the decorative layer.

2. The shaped part according to claim 1,
characterized in that
the light-shielding layer is a light-shielding element.

3. The shaped part according to claim 2,
characterized in that
the light-shielding element has one or more tips on a side facing away from the main body of the light-guiding element.

4. The shaped part according to claim 1,
characterized in that
the light-shielding layer comprises metal or plastic.

5. The shaped part according to claim 1,
characterized in that the light-shielding layer is designed to be reflective or mirrored towards the one or more light guides.

6. The shaped part according to claim 1, characterized in that the decorative layer comprises a decorative material, and the light-shielding layer comprises a first material and the light-guiding element comprises a second material, wherein at least one of the first material and the second material has a greater hardness or strength than the decorative material of the decorative layer.

7. The shaped part according to claim 6, characterized in that the first material has a greater hardness or strength than the second material.

8. The shaped part according to claim 1, characterized in that the one or more light guide(s) of the light-guiding element or the light-shielding layer has a shape that tapers towards the front side of the decorative layer, at least in sections.

9. A method for producing a shaped part, wherein the shaped part comprises:
a decorative layer having a front side designed as a visible side and a rear side opposite the front side,
a light-guiding element comprising a main body and one or more light guides protruding from the main body at a front side of the main body, wherein the main body is arranged with its front side at the rear side of the decorative layer, and the one or more light guide(s) completely penetrate the decorative layer from the rear side to the front side, and
one or more light elements arranged in and/or on the light-guiding element, wherein light emanating from the one or more light elements is guided to the front side of the decorative layer via the one or more light guides of the light-guiding element,
wherein a light-shielding layer is arranged between the surface of the one or more light guides and the decorative layer, wherein the light-shielding layer has an interruption on the front side of the decorative layer on each light guide, so that the light guided by the one or more light guides to the front side of the decorative layer can escape at the front side of the decorative layer,
wherein the light-shielding layer is a self-supporting and/or independently dimensionally stable light-shielding element,
wherein the method comprises the following steps:
a) providing a decorative material for forming the decorative layer, wherein a front side of the decorative material is intended for forming the front side of the decorative layer, and a rear side of the decorative material is intended for forming the rear side of the decorative layer,
b) providing the light-guiding element comprising main body and one or more light guides protruding from a front side of the main body,
c) providing the self-supporting and/or independently dimensionally stable light-shielding element with a front side and a rear side, wherein one or more free spaces for receiving the one or more light guides of the light-guiding element are formed on the rear side,
d) inserting the decorative material and the light-shielding element into a pressing tool, wherein the front side of the light-shielding element faces the rear side of the decorative material,
e) pressing the light-shielding element into the decorative material in such a way that the light-shielding element completely penetrates the decorative material from the rear side to the front side after pressing-in and demarcates one or more continuous recesses, formed by the pressing-in, in the decorative material towards the decorative material.

10. The method according to claim 9, characterized in that, prior to the insertion of the light-shielding element into the pressing tool according to step d), the light-guiding element is attached to the rear side of the light-shielding element in such a way that the one or more light guides of the light-guiding element are inserted into the free spaces in the light-shielding element and completely fills the free spaces, and thus the light-shielding element with the light-guiding element attached to its rear side is pressed into the decorative material according to step e).

11. The method according to claim 9, characterized in that, after pressing of the light-shielding element into the decorative material according to step e), the light-guiding element is attached to the rear side of the light-shielding element in such a way that the one or more light guide(s) of the light-guiding element inserted into the free spaces in the light-shielding element and completely fills the free spaces.

12. The method according to claim 9, characterized in that the light-shielding element to be provided according to step c) is produced by means at least one of an injection-molding process, casting process, forming process and stamping process.

13. A method for producing a shaped part, wherein the shaped part comprises:
a decorative layer having a front side designed as a visible side and a rear side opposite the front side,
a light-guiding element comprising a main body and one or more light guides protruding from the main body at a front side of the main body, wherein the main body is arranged with its front side at the rear side of the decorative layer, and the one or more light guides completely penetrate the decorative layer from the rear side to the front side, and
one or more light elements arranged in and/or on the light-guiding element, wherein light emanating from the one or more light elements is guided to the front side of the decorative layer via the one or more light guides of the light-guiding element,
wherein the method comprises the following steps:
a) providing a decorative material for forming the decorative layer, wherein a front side of the decorative material is intended for forming the front side of the decorative layer, and a rear side of the decorative material is intended for forming the rear side of the decorative layer,
b) providing the light-guiding element comprising main body and one or more light guides protruding from a front side of the main body,
c) inserting the decorative material and the light-guiding element into a pressing tool, wherein the front side of the main body of the light-guiding element faces the rear side of the decorative material
d) pressing the one or more light guides of the light-guiding element into the decorative material in such a way that the one or more light guides completely penetrate the decorative material after pressing-in.

14. The method according to claim 13, characterized in that a light-shielding layer is arranged on the surface of the one or more light guides of the light-guiding element to be provided according to step b), prior to the provision according to step b) or prior to the insertion into the pressing tool according to step c), wherein the light-shielding layer of each light guide has an interruption through which light can escape from the one or more light guides.

15. The method according to claim 9, characterized in that after pressing-in, the front side of the decorative material is ground and/or brushed off.

16. The method according to claim 9, characterized in that an adhesive layer is provided on the rear side of the decorative material prior to insertion into the pressing tool.

17. The method according to claim 9, characterized in that the light-guiding element is produced in one piece, wherein the one or more arranged in and/or on this one-piece light-guiding element.

18. The method according to claim 9, characterized in that the main body and the one or more light guides of the light-guiding element to be provided are produced separately and subsequently joined together, wherein the one or more light elements are arranged in and/or on the main body.

19. The method according to claim 9, characterized in that a carrier is attached to a rear side, opposite the front side, of the main body of the light-guiding element.

20. The method according to claim 9, characterized in that at least one of a transparent protective layer, a translucent protective layer, and an optical layer is applied to the front side of the decorative material.

\* \* \* \* \*